T. J. HAYES.
BLINDSTITCH SEWING MACHINE.
APPLICATION FILED DEC. 23, 1911.
1,131,373.
Patented Mar. 9, 1915.
4 SHEETS—SHEET 3.
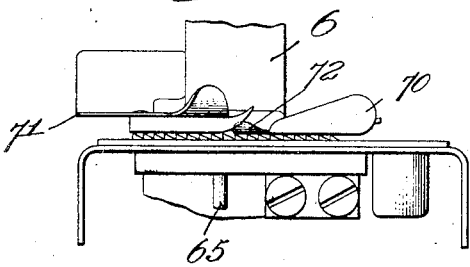
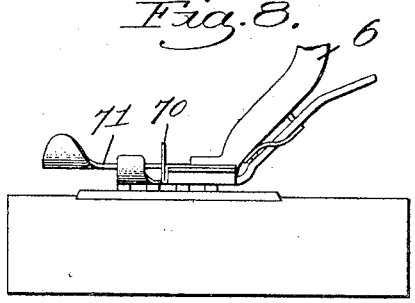
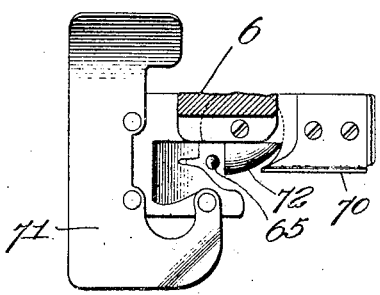
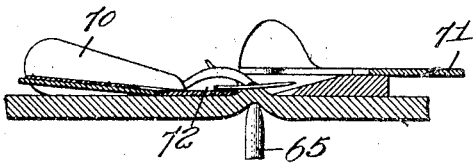
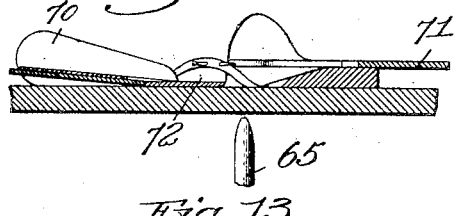
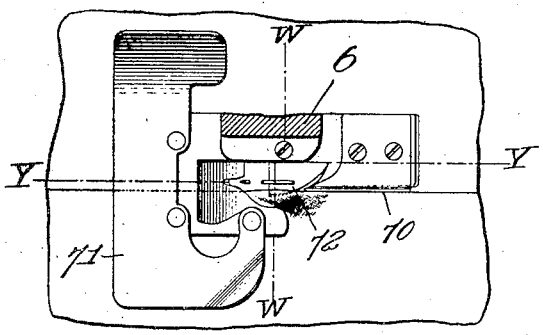
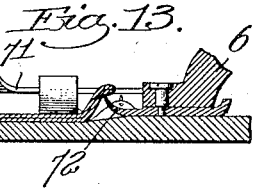
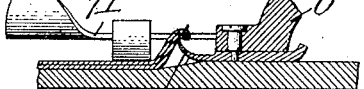
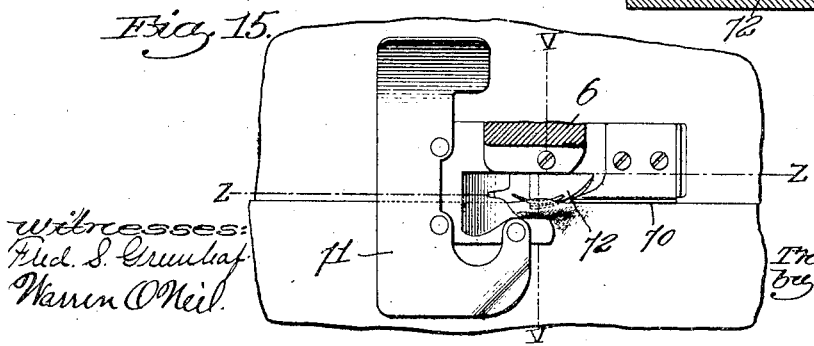

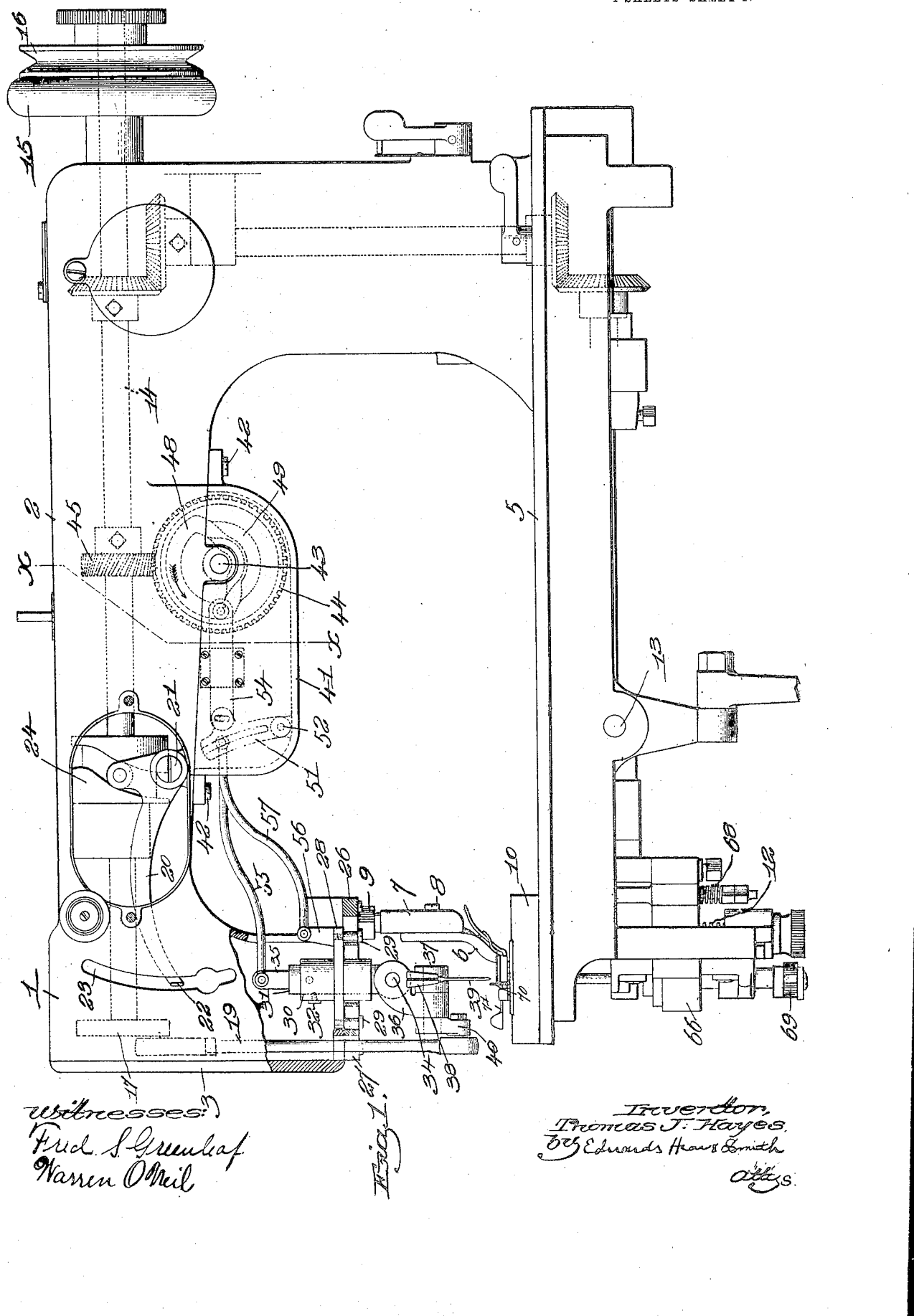

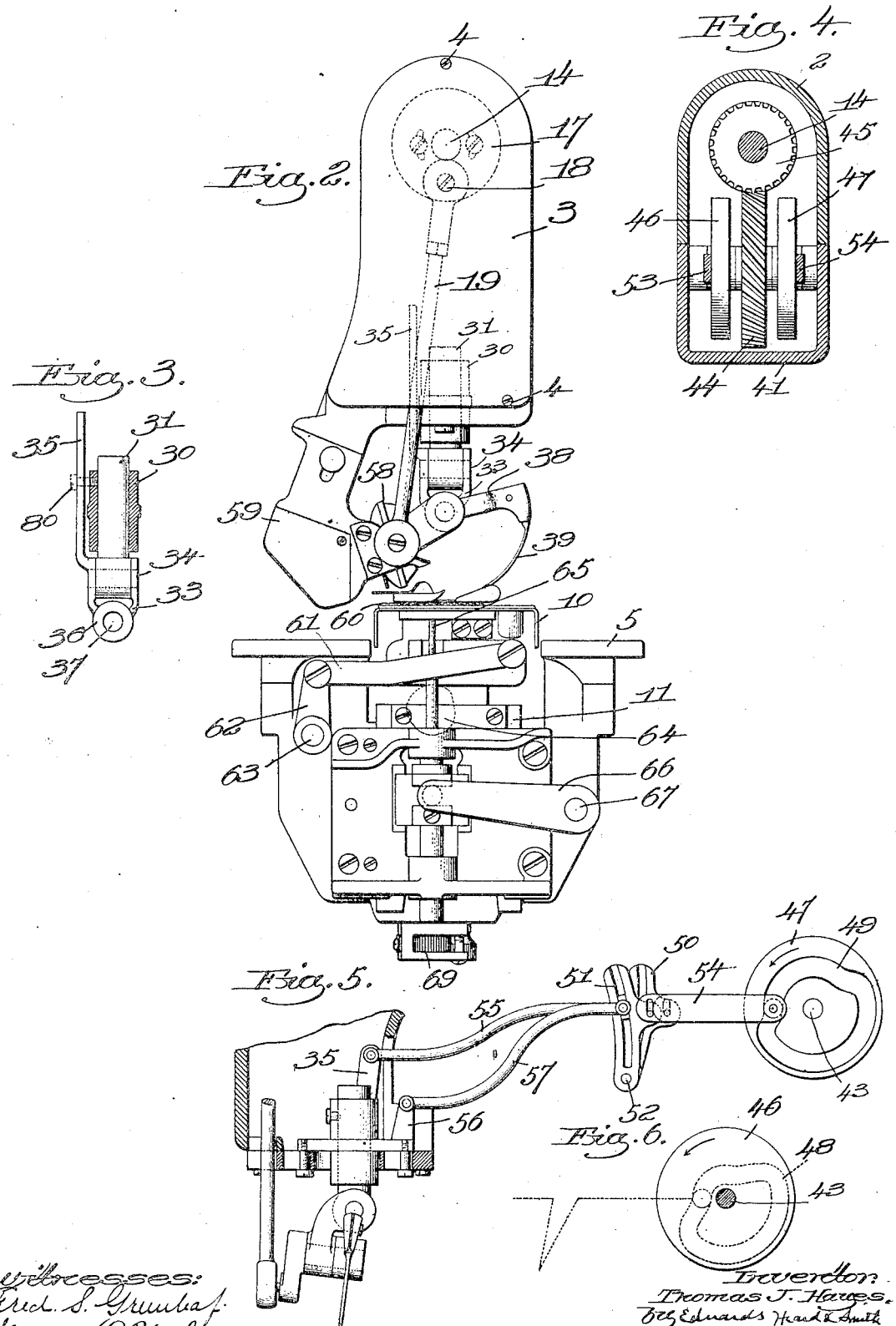

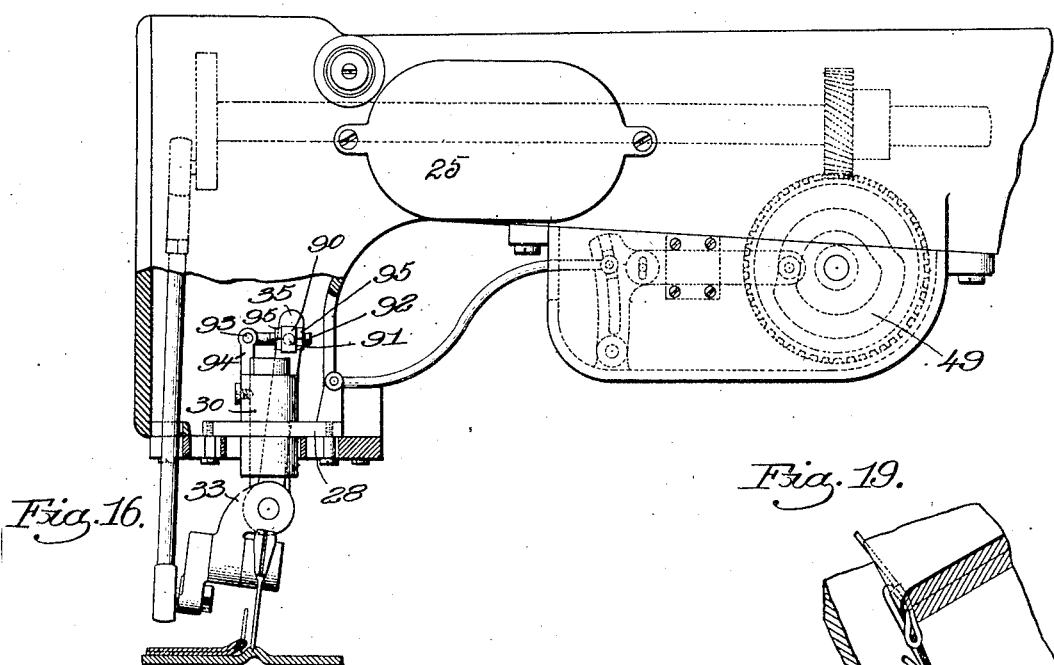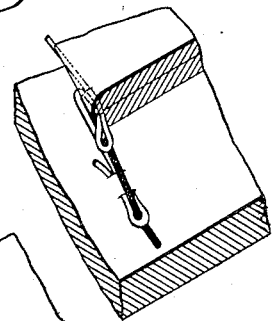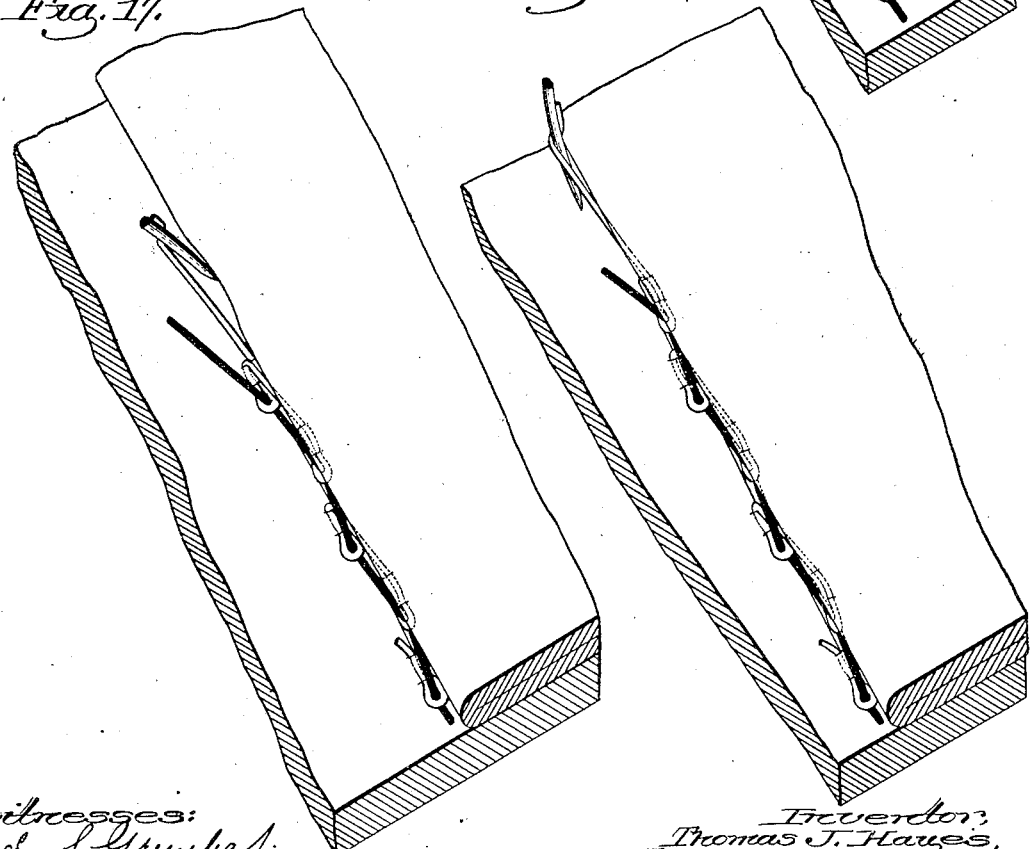

UNITED STATES PATENT OFFICE.

THOMAS J. HAYES, OF CLEVELAND, OHIO, ASSIGNOR TO ARBETTER FELLING MACHINE COMPANY, OF BOSTON, MASSACHUSETTS, A CORPORATION OF MAINE.

BLINDSTITCH SEWING-MACHINE.

1,131,373.  Specification of Letters Patent.  Patented Mar. 9, 1915.

Application filed December 23, 1911. Serial No. 667,467.

*To all whom it may concern:*

Be it known that I, THOMAS J. HAYES, a citizen of the United States, residing at Cleveland, county of Cuyahoga, State of Ohio, have invented an Improvement in Blindstitch Sewing-Machines, of which the following description, in connection with the accompanying drawing, is a specification, like characters on the drawing representing like parts.

This invention relates to machines for doing what is known as blind stitch work, wherein two or more pieces of fabric are united by stitches entering on and emerging from the same side of the work. Blind stitch sewing machines are now extensively used and mainly for two purposes, *i. e.*, in felling work where the edge, raw or inturned, of a superimposed layer or layers is united to a main or base fabric, and in padding work where two or more superimposed layers of fabric are united.

The machine herein illustrated as an embodiment of the present invention is in many of its features and much of its mechanism similar to the well known type of "Arbetter", or blind stitch sewing machine.

The broad feature of novelty of the present invention resides in the position of the needle during the stitching operation and the means for securing this position of the needle.

In the present invention, as in the Arbetter machines, a curved needle is employed, and when the needle is making the stitch in the superimposed layer or layers in felling or similar work it is supported and operated in a plane of oscillation obliquely inclined to the surface of the fabric and parallel to the superimposed edge, whereby the points of entrance and emergence of the needle, and consequently the ends of the stitch or the ends of the portion of the thread embedded in the superimposed layer or layers, are beneath the upper surface thereof and in a line parallel to the edge. It is to be understood that the term obliquely inclined is used above merely to define the plane of oscillation of the needle as other than at right angles to the surface of the fabric. This result is secured for the first time by this invention and materially aids in the concealment of the thread, which is desirable in felling work. The stitch in the main or base layer may be made with the needle in a plane of oscillation parallel to that just described or it may be made with the plane of oscillation of the needle vertical, as in the Arbetter type of machine, or even in other positions.

The invention is believed to be broadly new in the features set forth, and it is to be noted that the relation of the needle to the fabric is a relative one and that the results of the invention may be secured by changing the relative position of the support for the fabric and the plane of oscillation of the needle, although in the form of the invention herein illustrated it is the needle itself that is shifted, adjusted or positioned to bring its plane of oscillation into the required relation with the fabric.

The present invention also involves means for moving the curved needle bodily and laterally with respect to the line of seam between alternate or predetermined stitches. Preferably the plane of oscillation of the needle is maintained in both positions parallel to the line of seam, although the required relation of the plane of oscillation with respect to the plane of the work may change.

The nature of the invention will more fully appear from the accompanying description and drawings, and will be particularly pointed out in the appended claims.

The drawings illustrate preferred forms of machines embodying the invention, but these illustrations and the descriptions thereof are to be taken not as definitive of the limits of the invention, but simply as illustrative of certain forms of the invention.

In the drawings: Figure 1 is a side elevation, partially in cross section, of a blind stitch sewing machine embodying the invention; Fig. 2 is an end elevation of the machine shown in Fig. 1; Fig. 3 is a detail in end elevation of a portion of the construction for supporting and rocking the needle; Fig. 4 is a cross section taken on the line $x$—$x$ of Fig. 1; Fig. 5 is a view of a portion of the machine similar to Fig. 1, and showing the needle in different position; Fig. 6 is a view of the needle rocking cam; Fig. 7 is an end elevation of the presser foot and the coöperating parts beneath and the upper portion; Fig. 8 is a side elevation of the construction shown in Fig. 7; Fig. 9 is a top plan view of the presser foot; Fig. 10 is a cross section taken on the line $y$—$y$ of Fig. 12 to show the position of the needle in taking the stitch through the main layer; Fig. 11 is a view taken on the line z—z of Fig. 15, showing the position of the needle in taking the stitch in the superimposed layer; Fig. 12 is a top plan view of the presser foot with a piece of felling work therebeneath and showing the needle making the stitch in the main layer; Fig. 13 is a view in cross section taken on the line w—w of Fig. 12; Fig. 14 is a view in cross section taken on the line v—v of Fig. 15; Fig. 15 is a view similar to Fig. 12, showing the needle taking the stitch in the edge of the superimposed layer; Fig. 16 is a view of a portion of a machine similar to that already illustrated, but showing a slightly different form of the invention; Figs. 17, 18 and 19 are views in perspective, necessarily exaggerated and out of proportion, illustrating in perspective the seam as made by a machine of this invention.

It will be unnecessary to describe here in detail much of the mechanism of the sewing machine, because it is not necessary to an understanding of the present invention.

In the drawings 1 represents the head or forward end of the overhanging arm 2 of the machine and is provided with a face plate 3 which is removably secured to the head by screws 4. The overhanging arm 2 is supported in the usual manner from the work table 5. In this type of machine illustrated a presser foot 6 supported from the presser foot carrier 7 by the screw 8 is rigidly connected to the head 1, being vertically adjustable thereon by means of lock nuts, one of which is shown at 9.

The work support 10, presenting a flat surface beneath the presser foot projecting slightly above the work table 5, is mounted upon the work support stand 11, which slides vertically in ways and is held normally elevated by the spring 12. The work support is depressed by a lever operated in any suitable manner, as by the bell crank lever shown pivotally mounted at 13 in the frame of the machine and operable by the knee of the operator.

The main driving shaft 14 extends horizontally through the overhanging arm and is provided with the usual hand wheel 15 and pulley 16, by means of which rotation is imparted to it. At the forward end this shaft is provided with a rotarily adjustable disk 17, to which is eccentrically connected at 18 the needle operating rod 19.

Suitable take-up, tension and thread guiding devices are provided and need not be described specifically. The take-up is, however, shown as a bell crank lever 20 fulcrumed in the overhanging arm at 21, having its free end 22 projecting through a curved slot 23 in the side of the head and having its opposite end provided with a roller riding in a peripheral groove of a cam 24 secured to the main shaft 14. Access is had to the take-up by a plate 25 movably secured to the side of the overhanging arm.

The lower face of the head 3 has removably secured thereto a base plate 26 slotted at 27 for the passage of the needle operating rod 19. A carriage 28, shown as a sliding plate, is fitted to slide transversely of the head or transversely of the line of feed upon the base plate 26. For this purpose the carriage 28 is shown as provided with guiding and retaining screws 29 connected therewith and passing through elongated slots in the base plate 26. The carriage is provided with a vertical bearing sleeve 30, and the base plate is also slotted transversely to provide for the movement of this sleeve 30. A stud 31 is mounted in the sleeve 30 and is adjustable vertically therein by means of the set screw 32 and projects below the bottom of the sleeve 30. A tilting support 33 is pivotally mounted at 34 in the lower end of the stud 31, the axis of the pivot 34 being arranged parallel to the line of feed of the machine. This tilting support presents an upwardly projecting arm 35, by means of which it is tilted at required times, and a downwardly projecting arm 36 presenting a transverse bearing. The needle carrying rock shaft 37 is mounted in this bearing. The needle carrying arm 38 is mounted on the rock shaft 37 beneath the stud 31 and has clamped in its free end the curved needle 39, the curvature of which is substantially concentric with the axis of the shaft 37. The shaft 37 has secured at its opposite end the rocker arm 40, to which is connected the end of the needle operating rod 19 already described. Ball and socket connections are provided at each end of the needle operating rod 19.

In the position illustrated in Figs. 1 and 2 the plane of oscillation of the needle is vertical and parallel to the line of feed, and while oscillating in this plane the needle makes one series of stitches. To bring the plane of oscillation of the needle at an oblique inclination to the face of the work support or face of the fabric being stitched while maintaining this plane of oscillation parallel to the line of feed, the tilting support 33 is rocked about the pivot 34, but this rocking movement will usually separate the two rows of stitches more than is desirable, especially in felling work, and means are therefore provided for moving the needle bodily and laterally to compensate therefor. One form of suitable means for securing these results is shown and will now be described.

The lower side of the overhanging arm 2 is cut away and a box 41 is fastened beneath the opening by the screws 42. A shaft 43 journaled transversely of the main shaft 14 is provided with a spiral gear 44 intermeshing with a second spiral gear 45 secured to the main shaft 14. Disks 46 and 47 are secured to the shaft 43, one at each side of the gear 44, and these disks are provided on their faces with cam grooves 48 and 49 respectively. Slotted segmental levers 50 and 51 are pivoted at their lower ends at 52 and are connected respectively to slide bars 53 and 54, which carry at their opposite ends rolls riding in the respective cam grooves 48 and 49. The upper end of the arm 35 of the tilting support 33 is connected by a link 55 with a block adjustably secured in the slot of the segmental lever 50, while a projection 56 on the carriage 28 is connected by a link 57 with a block adjustably mounted in the slot of the segmental lever 51.

The gear 44 makes a half revolution to one revolution of the driving shaft 45 and consequently a half revolution for each complete oscillation of the needle. The cam groove 49 is so shaped that during at least that portion of one complete oscillation of the needle while engaging the fabric the carriage 28 shall be in one lateral position, and during at least that portion of another oscillation of the needle while it is penetrating the fabric the carriage 28 shall be in another lateral position. Thus the needle is moved bodily and laterally between predetermined or, as herein illustrated, alternate stitches. The cam 48 is so shaped that there shall be no movement of the tilting support during at least that portion of the complete oscillation of the needle while it is engaging the fabric, but that during the bodily lateral movement of the needle from one lateral position to another the tilting support shall be simultaneously tilted to bring the plane of oscillation of the needle into the required angular relation with respect to the face of the work support or face of the fabric being stitched, while maintaining it parallel to the line of feed.

In the construction illustrated in Figs. 1 and 2 the machine is shown as particularly designed for felling work, wherein two rows of stitches are made with the stitches of the one row alternating with those of the other and the feed taking place preferably after each stitch. In this case one row of stitches is made in the main or base fabric close up to the edge of the superimposed layer or layers, while the other row of stitches is made directly in and slightly under the edge of the superimposed layer or layers so that when the tension is applied and the seam is finished the thread will be entirely concealed beneath the edge of the superimposed layer or layers. In the machine as arranged in Figs. 1 and 2 the needle in making the straight row of stitches oscillates in a vertical plane parallel with the line of feed, while in making the row of stitches in the edge of the superimposed layer it oscillates in a plane inclined to the surface of the fabric and parallel to the line of feed, as shown in Fig. 5.

The details of the complemental stitch forming mechanism, the feeding mechanism, the mechanism for causing the fabric to be presented at the right height to be caught by the needle and the other adjunctive devices of the machine it is unnecessary to describe in detail, as in their general features they are familiar in the Arbetter type of machine and may be found illustrated and described in the Arbetter application 436,223, filed June 2, 1908.

The present machine is shown as provided with the usual rotary hook and inclosed bobbin and bobbin case 58 supported in the hook casing 59 depending from the head 1. The feed dog 60 receives its back and forth or horizontal feeding movement from the link 61 connected to the rocker arm 62 projecting from the shaft 63, while the up and down or vertical movement is given by the cam 64 mounted in the vertically movable work support stand 11.

The work is presented at the right elevation to be caught by the needle in its thrusts by a vertically operating bender 65 receiving its movements from the rocker arm 66 mounted on the rock shaft 67 and the spring 68, the spring acting to raise the bender and the rocker arm to depress it. Suitable means for adjusting the vertical position of the bender are shown at 69. In the case of felling work it is unnecessary to elevate the work by the bender when the stitch is made in the edge of the superimposed layer or layers, but it is usually necessary to elevate the work when the stitch is made in the main layer, by causing the bender to push the work up through the presser foot into the path of the needle. In the case of felling work, therefore, the bender is operated at each alternate complete oscillation of the needle.

The details of the mechanisms just described and other adjunctive mechanisms of the machine are familiar in the Arbetter machines and are illustrated in the drawings of the Arbetter patent referred to.

The presser foot and the relation of the work and needle thereto during the stitching operation upon felling work is made clear by Figs. 7 to 15 inclusive of the drawings. In these views the relative proportions are somewhat exaggerated for the purposes of illustration. The presser foot 6 carries at its heel portion a suitable edge guide 70 for the edge of the superimposed layer or layers, and at its toe portion is provided with a guard plate 71, both of which may be of any suitable size and shape. The rear portion 72 of the needle throat carried by the presser foot is curved so that its upper surface is substantially concentric with the axis 34 about which the needle is bodily tilted, and it is also curved rearwardly to correspond substantially to the curvature of the needle so that the needle in making either of its oscillations in any plane to which it may be tilted will rub lightly against this portion of the needle throat prior to its entry into the fabric, thus insuring the accurate guiding and positioning of the needle as it enters the fabric. To make a straight stitch parallel with the edge of the superimposed layer or layers the bender 65 acts to elevate the work through the opening in the presser foot in front of the part 72, so that it will be caught sufficiently by the needle. In making the stitch in the edge of the superimposed layer or layers when the plane of oscillation of the needle is inclined the edge of the superimposed layer or layers rests over the edge of the part 72 so that the needle is guided through the edge and beneath the upper surface of the work. In Figs. 10, 12 and 13 the needle is shown as making the straight stitch in the base layer, and in Figs. 11, 14 and 15 as making the stitch in the edge of the superimposed layer or layers. By the construction thus illustrated it will be obvious that the superimposed layer is guided accurately in such a manner as to present its under surface to the needle during one series of oscillations thereof and that the bender presents a predetermined portion of the base layer to the needle during the alternate series of oscillations of the needle so that the presentation of defined portions of the work in the path of the needle at each thrust is insured. A seam such as made by the machine as thus described is represented in Figs. 17, 18 and 19, although it is to be understood that in these figures there is necessarily exaggeration and want of proportion in order to illustrate clearly the general relation of the fabric and threads. It will be seen however that with the threads positioned in the fabric by the machine and with the proper tension applied the entire concatenation of threads will be substantially, if not entirely, concealed beneath the superimposed layer or layers.

The machine as thus described is readily adapted for "padding" work, that is, the stitching of two or more superimposed layers together. In such work the parallel rows of stitches are usually considerably separated to produce a wider seam with a consequent fastening together of the layers over a greater area. In such case it is not necessary to change the angular relation of the plane of oscillation of the needle with respect to the work, and consequently means are provided for locking the tilting support in one position, and for this purpose a set screw 80 may be employed passing through the arm 35 of the tilting support and into the sleeve 30. When this is done the cam 48 is disconnected from the arm 35 of the tilting support. The needle will then be moved bodily laterally by the cam 49. The bender will be arranged to reciprocate at each oscillation of the needle to elevate the work at each stitch into the path of the needle and so that it will pass through the top layers and into the lower layer, and the presser foot will be of the kind employed upon padding machines to allow of this operation.

The essential and broad features of the invention may also be secured by a sewing machine in which the plane of oscillation of the needle is maintained at a predetermined and fixed angular relation to the face of the fabric or work support and parallel to the line of feed. In the case of felling work it is provided by the invention that the needle in making the stitch in the edge of the superimposed layer or layers shall oscillate in a plane parallel to the line of feed and inclined, but it may operate in the same manner in making the straight stitch in the main or base layer, because this latter stitch is usually a short one and it is immaterial whether the plane of oscillation of the needle is inclined or not in making the straight stitch. Consequently in Fig. 16 there is shown so much of the modified machine as is necessary to an understanding of this adaptation of the invention. In this case the parts are substantially the same as those already described except that the means and connections for rocking the tilting support for the needle are omitted. In this case the arm 35 of the tilting support is provided with a sleeve 90 pivoted thereto at 91. A screw threaded bar 92 passes through the sleeve and is pivoted at 93 to an upright 94 from the sleeve 30 and lock nuts 95 on the bar 92 clamped against opposite faces of the sleeve 90. By this means the tilting support 33 may be adjusted to give any required degree of angularity to the plane of oscillation of the needle, and may be locked in its adjusted position. Upon the operation of the machine the cam 49, through its connections to the carriage 28, will move the needle bodily and laterally between alternate stitches. It will be observed that this form of machine may be used either for felling or for padding upon proper timing of the bender mechanism. In the case of either form of the machine, it will also be noted that the distance between the parallel rows of stitches may be varied with great nicety, and in the case of felling work these two rows of stitches may be made very close together so as to make a very narrow width of seaming, which is important in felling work; but the rows of stitches may also be adjusted to a sufficient distance apart to produce the most satisfactory form of padding seam, where a wide spread of stitching is desirable.

The invention in its broad aspect is further present in a machine wherein in addition to the principles described the plane of oscillation of the needle is also slightly inclined to the line of feed so long as it extends in the direction of the line of feed, thus, in the case of felling work, enabling the needle to enter the edge of the superimposed layer or layers slightly further under and away from the edge than it emerges. This is accomplished in the forms of the machine herein illustrated in Fig. 1 and Fig. 16 by rotarily adjusting the stud 31 in the sleeve 30 through the medium of the set screw 32.

One of the most important features of the invention as has already been pointed out, is that the plane of oscillation of the curved needle when making the stitch in the superimposed layer shall not be at right angles to the general surface of the work but shall occupy a position obliquely inclined to the surface of the work or a position at an angle to the vertical in the usual type of upright machine. While a certain form of mechanism has been illustrated for mounting and operating the curved needle with its plane of oscillation at an angle to the vertical, it is obvious that the invention is not limited to such mechanism nor to the particular angle of inclination. The invention enables the needle in making the stitch in the superimposed layer to enter under the edge and preferably also to emerge under the edge as has been explained and as shown by the drawings.

Having fully described my invention, what I claim as new and desire to secure by Letters Patent is:

1. A sewing machine for blind stitching, comprising a work support; a curved oscillating needle and complemental stitch forming mechanism located above the work support; means for feeding the work across the work support; means, acting between successive stitches, for changing the angular relation of the plane of oscillation of the needle with respect to the work support while maintaining the said plane parallel to the line of feed.

2. A sewing machine for blind stitching, comprising a work support; a curved oscillating needle and complemental stitch forming mechanism located above the work support; means for feeding the work across the work support; means, acting between successive stitches, for changing the angular relation of the plane of oscillation of the needle with respect to the work support while maintaining the said plane parallel to the line of feed, and for moving the needle bodily laterally.

3. A sewing machine for blind stitching, comprising a work support; a curved oscillating needle and complemental stitch forming mechanism located above the work support; means for feeding the work across the work support; means, acting between successive stitches, for changing the angular relation of the plane of oscillation of the needle with respect to the work support while maintaining the said plane parallel to the line of feed; and means for presenting defined portions of the work in the path of the needle at each thrust.

4. A sewing machine for blind stitching, comprising a work support; a curved oscillating needle and complemental stitch forming mechanism located above the work support; means for feeding the work across the work support; means, acting between successive stitches, for changing the angular relation of the plane of oscillation of the needle with respect to the work support while maintaining the said plane parallel to the line of feed, and for moving the needle bodily laterally; and means for presenting defined portions of the work in the path of the needle at each thrust.

5. A sewing machine for blind stitching for felling the edge of a superimposed layer or layers to a main layer of material, comprising a curved oscillating needle and complemental stitch forming mechanism located and operating above the material and means for presenting the said needle during its penetration of the edge thereof, with the plane of oscillation obliquely inclined to the surface of the fabric and parallel to the line of feed, whereby the points of entrance and emergence of the needle, and consequently the ends of the stitch or the ends of the portion of the thread embedded in the superimposed layer or layers, are beneath the upper surface thereof and in a line substantially parallel to the edge.

6. A sewing machine for blind stitching, comprising a work support, a curved oscillating needle and complemental stitch forming mechanism located above the work support; means for feeding the work across the work support; and means for presenting the needle with its plane of oscillation obliquely inclined to the work support and extending in the direction of the line of feed at the stitching point.

7. A sewing machine for blind stitching, comprising a work support; a curved oscillating needle and complemental stitch forming mechanism located above the work support; means for feeding the work across the work support; means for vibrating the needle laterally to produce two rows of stitches; and means for presenting the needle while making the stitches of one of the said rows with its plane of oscillation obliquely inclined to the work support and parallel to the line of feed at the stitching point.

8. A sewing machine for blind stitching, comprising a work support, a curved oscillating needle and complemental stitch forming mechanism located above the work support; means for feeding the work across the work support; means for vibrating the needle laterally to produce two rows of stitches, means for presenting the needle while making the stitches of one of the said rows with its plane of oscillation obliquely inclined to the work support and parallel to the line of feed at the stitching point; and means for presenting the needle while making the stitches of the other row with its plane of oscillation inclined to the work support at the stitching point.

9. A sewing machine for blind stitching, comprising a work support, a curved oscillating needle and complemental stitch forming mechanism located above the work support; means for feeding the work across the work support; means for vibrating the needle laterally to produce two rows of stitches; and means for presenting the needle while making the stitches of both of the said rows with its plane of oscillation obliquely inclined to the work support and parallel to the line of feed at the stitching point.

10. A sewing machine for blind stitching, comprising a work support, a curved oscillating needle and complemental stitch forming mechanism located above the work support; means for feeding the work across the work support; means for vibrating the needle laterally to produce two rows of stitches; and means for presenting the needle while making the stitches of both of the said rows with its plane of oscillation obliquely inclined and at the same angle of inclination to the work support and parallel to the line of feed at the stitching point.

11. A sewing machine for blind stitching, comprising a work support; a curved oscillating needle and complemental stitch forming mechanism located above the work support; means for producing a relative lateral vibration between the work support and the needle to produce two rows of stitches; means for feeding the work across the work support and means for presenting the needle while making the stitches of one of the said rows with its plane of oscillation inclined to the work support and extending in the direction of the line of feed at the stitching point.

12. A sewing machine for blind stitching, comprising a work support, a curved oscillating needle and complemental stitch forming mechanism located above the work support; means for producing a relative lateral vibration between the work support and the needle to produce two rows of stitches; means for feeding the work across the work support; means for presenting the needle while making the stitches of one of the said rows with its plane of oscillation inclined to the work support and extending in the direction of the line of feed at the stitching point; and means for presenting the needle while making the stitches of the other row with its plane of oscillation inclined to the work support at the stitching point.

13. A sewing machine for blind stitching, comprising a work support, a curved oscillating needle and complemental stitch forming mechanism located above the work support; means for producing a relative lateral vibration between the work support and the needle to produce two rows of stitches; means for feeding the work across the work support and means for presenting the needle while making the stitches of both of the said rows with its plane of oscillation inclined to the work support and extending in the direction of the line of feed at the stitching point.

14. A sewing machine for blind stitching, comprising a work support, a curved oscillating needle and complemental stitch forming mechanism located above the work support; means for producing a relative lateral vibration between the work support and the needle to produce two rows of stitches; means for feeding the work across the work support and means for presenting the needle while making the stitches of both of the said rows with its plane of oscillation inclined and at the same angle of inclination to the work support and extending in the direction of the line of feed at the stitching point.

15. A sewing machine for blind stitching, comprising a work support, a curved oscillating needle and complemental stitch forming mechanism located above the work support; means for feeding the work across the work support; means for vibrating the needle laterally to produce two rows of stitches; means for presenting the needle while making the stitches of one of said rows with its plane of oscillation inclined to the work support and extending in the direction of the line of feed at the stitching point; and means for holding an edge of material raised above the work support at the stitching point.

16. A sewing machine for blind stitching, comprising a work support; a curved oscillating needle and complemental stitch forming mechanism located above the work support; means for feeding the work across the work support; means for vibrating the needle laterally to produce two rows of stitches; means for presenting the needle while making the stitches of one of the said rows with its plane of oscillation inclined to the work support and extending in the direction of the line of feed at the stitching point; and a presser foot having a needle throat and provided at the needle throat with laterally projecting portion, the upper surface of the throat and projection being concaved to correspond with the path of the needle movement.

17. A sewing machine for blind stitching, comprising a work support, a curved oscillating needle and complemental stitch forming mechanism located above the work support; means for feeding the work across the work support; means for presenting the needle with its plane of oscillation obliquely inclined to the work support and extending in the direction of the line of feed at the stitching point; a sliding support or carriage for the needle and means for reciprocating said carriage transversely of the line of feed to move the needle bodily laterally and produce two rows of stitches.

18. A sewing machine for blind stitching, comprising a work support; a curved oscillating needle and complemental stitch forming mechanism located above the work support; means for feeding the work across the work support; means for vibrating the needle laterally to produce two rows of stitches; and means for presenting the needle while making the stitches of one of the said rows with its plane of oscillation obliquely inclined to the work support.

19. A sewing machine for blind stitching, comprising a work support, a curved oscillating needle and complemental stitch forming mechanism located above the work support; means for feeding the work across the work support; means for vibrating the needle laterally to produce two rows of stitches; means for presenting the needle while making the stitches of one of the said rows with its plane of oscillation obliquely inclined to the work support; and means for presenting the needle while making the stitches of the other row with its plane of oscillation inclined to the work support at the stitching point.

20. A sewing machine for blind stitching, comprising a work support; a curved oscillating needle and complemental stitch forming mechanism located above the work support; means for feeding the work across the work support; means for vibrating the needle laterally to produce two rows of stitches; and means for presenting the needle while making the stitches of both of the said rows with its plane of oscillation obliquely inclined to the work support.

21. A sewing machine for blind stitching, comprising a work support, a curved oscillating needle and complemental stitch forming mechanism located above the work support; means for feeding the work across the work support; means for vibrating the needle laterally to produce two rows of stitches; and means for presenting the needle while making the stitches of both of the said rows with its plane of oscillation obliquely inclined and at the same angle of inclination to the work support.

22. A sewing machine for blind stitching, comprising a work support, a curved oscillation needle and complemental stitch forming mechanism located above the work support; means for feeding the work across the work support; means for vibrating the needle laterally to produce two rows of stitches; and means for presenting the needle while making the stitches of one of the said rows with its plane of oscillation obliquely inclined to the work support and parallel to the line of feed at the stitching point.

23. A sewing machine for blind stitching, comprising a work support, a curved oscillating needle and complemental stitch forming mechanism located above the work support; means for feeding the work across the work support; means for presenting the needle with its plane of oscillation obliquely inclined to the work support and extending in the direction of the line of feed; and means for presenting defined portions of the work in the path of the needle at each thrust.

24. A sewing machine for uniting a main layer of fabric and a superimposed layer presenting an edge thereon by blind stitching comprising a work support; a curved oscillating needle and complemental stitch forming mechanism located above the work support; means for feeding the work across the work support; and means for presenting the needle and supporting the edge of the superimposed layer at the stitching point to cause the needle in its penetrating stroke to enter, and emerge from, the superimposed layer under the edge.

25. A sewing machine for uniting a main layer of fabric and a superimposed layer presenting an edge thereon by blind stitching comprising a work support; a curved oscillating needle and complemental stitch forming mechanism located above the work support; means for feeding the work across the work support; and means for presenting the plane of the needle oscillation at an angle to the vertical and for supporting the edge of the superimposed layer at the stitching point to cause the needle in its penetrating stroke to enter, and emerge from, the superimposed layer under the edge.

In testimony whereof, I have signed my name to this specification, in the presence of two subscribing witnesses.

THOMAS J. HAYES.

Witnesses:
MABEL REYNOLDS,
ROBERT LEWIS AMES.